(12) United States Patent
Wang

(10) Patent No.: US 12,451,568 B2
(45) Date of Patent: Oct. 21, 2025

(54) BUTTON BATTERY

(71) Applicant: SHENZHEN HYNETECH COMPANY LIMITED, Guangdong (CN)

(72) Inventor: Xiaoxia Wang, Guangdong (CN)

(73) Assignee: SHENZHEN HYNETECH COMPANY LIMITED, Guangdong (CN)

( * ) Notice: Subject to any disclaimer, the term of this patent is extended or adjusted under 35 U.S.C. 154(b) by 491 days.

(21) Appl. No.: 17/922,274

(22) PCT Filed: Apr. 25, 2021

(86) PCT No.: PCT/CN2021/089688
§ 371 (c)(1),
(2) Date: Oct. 28, 2022

(87) PCT Pub. No.: WO2021/218868
PCT Pub. Date: Nov. 4, 2021

(65) Prior Publication Data
US 2023/0163432 A1    May 25, 2023

(30) Foreign Application Priority Data
Apr. 30, 2020  (CN) .......................... 202010367316.X

(51) Int. Cl.
H01M 50/538 (2021.01)
H01M 50/109 (2021.01)
(Continued)

(52) U.S. Cl.
CPC ....... *H01M 50/538* (2021.01); *H01M 50/109* (2021.01); *H01M 50/166* (2021.01);
(Continued)

(58) Field of Classification Search
CPC ............. H01M 50/538; H01M 50/109; H01M 50/545; H01M 50/184; H01M 50/166;
(Continued)

(56) References Cited

U.S. PATENT DOCUMENTS

| 6,265,100 B1 | 7/2001 | Saaski et al. |
| 2011/0091753 A1 | 4/2011 | Wang et al. |

(Continued)

FOREIGN PATENT DOCUMENTS

| CN | 101359747 A | 2/2009 |
| CN | 104332647 A | 2/2015 |

(Continued)

OTHER PUBLICATIONS

Notice of Reason for Refusal (w/ English translation) for corresponding Application No. JP2022-566496, dated Dec. 19, 2023, 11 pages.

(Continued)

*Primary Examiner* — James Lee
(74) *Attorney, Agent, or Firm* — Dority & Manning, PA

(57) ABSTRACT

A button battery, comprising a pole assembly unit which comprises a first winding core, a first tab, and a first current collector; the first winding core comprises a first electrode layer, a second electrode layer, and a first separator sandwiched between the adjacent first electrode layer and second electrode layer, the polarities of the first electrode layer and second electrode layer being opposite to each other. The button battery also comprises a battery housing, a battery cover, and an insulating sealing ring; the battery housing forms a sealed cavity with the battery cover by means of the sealing ring; an electrolyte is stored within the sealed cavity; the pole assembly unit is disposed within the sealed cavity; and the first electrode layer is electrically connected to the battery cover by the first tab, and the second electrode layer (Continued)

is electrically connected to the battery housing by the first current collector.

9 Claims, 7 Drawing Sheets

(51) Int. Cl.
*H01M 50/166* (2021.01)
*H01M 50/184* (2021.01)
*H01M 50/545* (2021.01)
*H01M 50/566* (2021.01)

(52) U.S. Cl.
CPC ....... *H01M 50/184* (2021.01); *H01M 50/545* (2021.01); *H01M 50/566* (2021.01)

(58) Field of Classification Search
CPC ............. H01M 50/566; H01M 50/153; H01M 50/181; H01M 50/216; H01M 10/0427; H01M 10/0431; H01M 10/285
See application file for complete search history.

(56) References Cited

U.S. PATENT DOCUMENTS

| | | | |
|---|---|---|---|
| 2014/0315061 A1* | 10/2014 | Wang | H01M 10/0587 429/94 |
| 2021/0296742 A1* | 9/2021 | Tsang | H01M 50/107 |

FOREIGN PATENT DOCUMENTS

| | | |
|---|---|---|
| CN | 107195842 A | 9/2017 |
| CN | 108963177 A | 12/2018 |
| CN | 208385555 U | 1/2019 |
| CN | 208738342 U | 4/2019 |
| CN | 210245625 U | 4/2020 |
| CN | 111509148 A | 8/2020 |
| CN | 111653815 A | 9/2020 |
| JP | 2007294111 | 11/2007 |
| JP | 2016100122 | 5/2016 |

OTHER PUBLICATIONS

PCT International Search Report and Written Opinion (with English translations) for corresponding PCT Application No. PCT/CN2021/089688, mailed Jul. 29, 2021, 16 pages.
Chinese Office Action for corresponding Chinese Application No. 202010367316.X, dated Feb. 9, 2022, 8 pages.
Chinese Office Action for corresponding Chinese Application No. 202010367316.X, dated Jul. 27, 2022, 6 pages.

* cited by examiner

BUTTON BATTERY

CROSS-REFERENCE TO RELATED APPLICATIONS

The present application is a national phase application of International Application No. PCT/CN2021/089688, filed Apr. 25, 2021 which, in turn, claims the right of priority to Chinese Patent Application No. CN202010367316.X, filed Apr. 30, 2020, the disclosures of both of which are hereby incorporated by reference herein in their entirety for all purposes.

TECHNICAL FIELD

The present disclosure relates to a technical field of button batteries, in particular to a button battery.

BACKGROUND

Currently, as a mobile power source, button batteries are widely used in various occasions and become an indispensable product for people. The conventional button-type electrode assembly unit includes a housing, an electrode assembly, and electrolyte. The electrode assembly has laminated type and wound type.

Currently, the winding type button battery has poor conduction, resulting in an increase in internal resistance and unstable energy of a cell.

SUMMARY

Accordingly, it is necessary to provide button battery, the button battery can increase a contact area, which is beneficial to improve a charging and discharging performance, and improve a stability of the battery during operation.

The technical solutions are as follows.

In one aspect, the present disclosure provides a button battery including an electrode assembly unit, the electrode assembly unit includes a first winding core, a first tab and a first current collector, the first winding core includes a first electrode layer, a second electrode layer, and a first diaphragm sandwiched between the first electrode layer and the second electrode layer that are adjacent o each other, the first electrode layer and the second electrode layer have opposite polarities, the button battery further includes a battery housing, a battery cover and an insulating sealing ring, the battery housing forms a sealing cavity with the battery cover through the sealing ring, electrolyte is stored in the sealing cavity, the electrode assembly unit is located in the sealing cavity, and the first electrode layer is electrically connected to the battery cover through the first tab, and the second electrode layer is electrically connected to the battery housing through the first current collector.

The button battery can be flexibly designed according to an internal space requirement of an electronic device. Specifically, according to a shape characteristic of the button battery, a shape of the sealing cavity is designed, then the first winding core is used to form a required electrode assembly shape. The first electrode layer is electrically connected to the battery cover through the first tab, the second electrode layer is electrically connected to the battery housing through the first current collector, then then the first tab is used to form an electrode, and the first current collector is used for finishing to form another electrode, which can increase a contact area and is beneficial to reduce an internal resistance of a cell. The button battery can increase the contact area, which is beneficial to reduce the internal resistance of the battery cell, improve a charging and discharging performance, and improve a stability of the battery during operation.

The technical solutions are further described below.

In one of the embodiments, the electrode assembly unit further includes a second winding core, the second winding core cooperates with the first winding core to form a preset shape, the second winding core includes a third electrode layer having the same polarity as the first electrode layer, a fourth electrode layer having the same polarity as the second electrode, and a second diaphragm sandwiched between the third electrode layer and the fourth electrode layer that are adjacent to each other, the first electrode layer and the third electrode layer are both electrically connected to the battery cover through the first tab, the second electrode layer and the fourth electrode layer are both electrically connected to the battery housing through the first current collector. In this way, the first winding core and the second winding core are used to form the preset shape (that is, a shape of a required electrode assembly can be flexibly set according to the shape of the button battery). The first electrode layer and the third electrode layer are electrically connected through the first tab, and the second electrode layer and the fourth electrode layer are electrically connected through the first current collector, so that the first winding core and the second winding core are relatively independent and work in parallel, which can reduce the internal resistance. Compared with conventional wound electrode assembly, the electrode assembly unit has lower internal resistance, and compared with the laminated electrode assembly, a construction of the electrode assembly can be completed only by combining the first winding core and the second winding core, the assembly process is simple. The button battery adopts the above-mentioned electrode assembly unit, which uses the relatively independent winding core to complete the construction of the electrode assembly, the winding core will not expand along its axial direction, thereby avoiding damage to a sealing structure, so that a sealing of the sealing cavity is reliable, and it is not easy to leak liquid. At the same time, using the first winding core and the second winding core to work in parallel is beneficial to improve the charging and discharging rate performance and meet the requirements of electronic products for fast charging.

In one of the embodiments, the electrode assembly unit further comprises a third winding core, the third winding core cooperates with the first winding core and the second winding core to form a preset shape, the third winding core comprises a fifth electrode layer having the same polarity as the first electrode layer, a sixth electrode layer having the same polarity as the second electrode, and a third diaphragm sandwiched between the fifth electrode layer and the sixth electrode layer that are adjacent to each other, the first electrode layer, the third electrode layer and the fifth electrode layer are all electrically connected to the battery cover through the first tab, the second electrode layer, the fourth electrode layer and the sixth electrode layer are all electrically connected to the battery housing through the first current collector.

In one of the embodiments, the electrode assembly unit further comprises an insulating fixing member, the fixing member is respectively fixed to the first winding core and the second winding core.

In one of the embodiments, the electrode assembly unit further comprises a second current collector, the first electrode layer is electrically connected to the first tab through the second current collector.

In one of the embodiments, the first tab comprises a connecting body, a welding body, and an elastic sheet structure located between the connecting body and the welding body, the connecting body is electrically connected to the first electrode layer, the welding body is welded to the battery cover.

In one of the embodiments, The button battery further comprises a first insulating pad and a second insulating pad, the first insulating pad is located between the electrode assembly unit and the battery cover, the second insulating pad is located between the electrode assembly unit and a bottom wall of the battery housing.

In one of the embodiments, the electrode assembly unit further comprises a second tab electrically connected to the first current collector, the second tab is located between the second insulating pad and the battery housing, and is welded to the bottom wall of the battery housing.

In one of the embodiments, the battery housing is provided with an accommodating cavity, the battery housing comprises an annular receiving body and a pressing body located on the receiving body, the receiving body is sleeved on an outer side of the accommodating cavity and is located at an opening of the accommodating cavity, the battery cover is located between the receiving body and the pressing body through the sealing ring, the pressing body cooperates with the receiving body to clamp and fix the battery cover and the sealing ring.

In one of the embodiments, the sealing ring is located between the receiving body and the pressing body, and forms a groove configured to wrap the battery cover.

Figure 1:
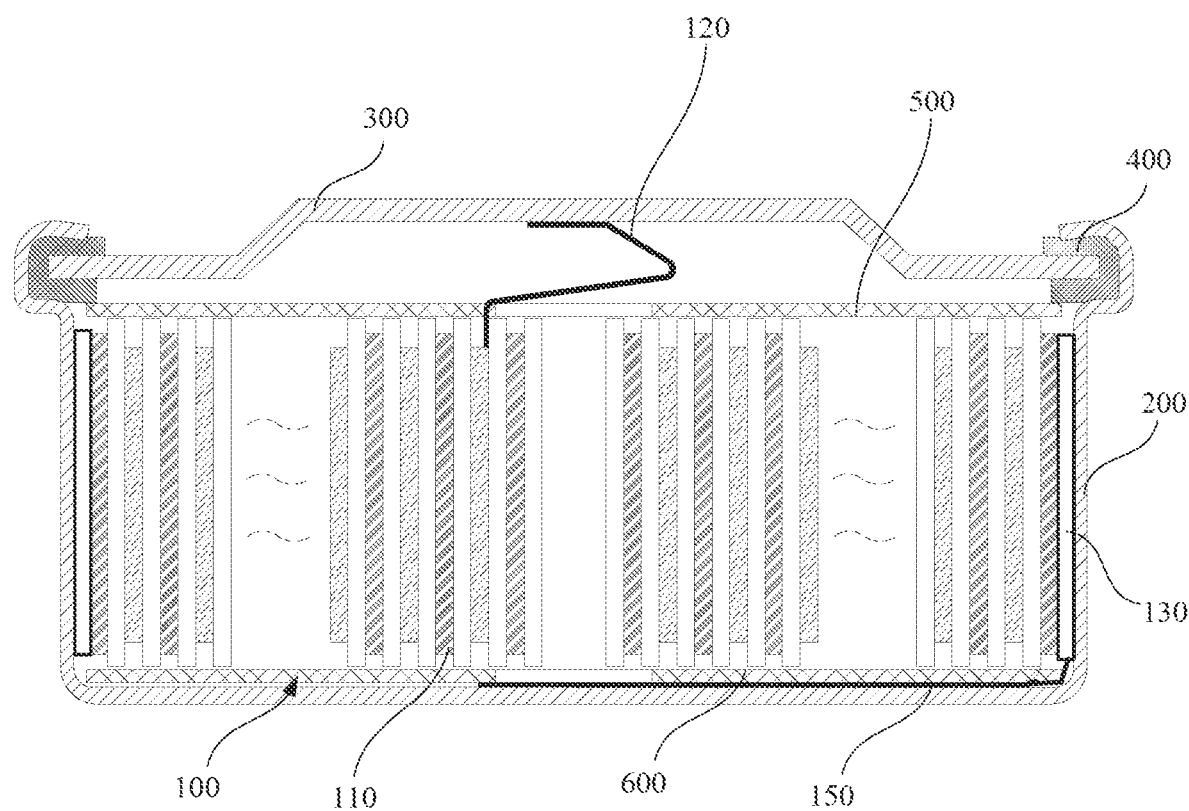
FIG. 1 is a half-sectional view of a button battery according to an embodiment.

DESCRIPTION OF REFERENCE NUMERALS 100, electrode assembly unit; 110, first winding core; 112, first electrode layer; 114, second electrode layer; 116, first diaphragm; 120, first tab; 122, connection body; 124, welding body; 126, elastic sheet structure; 130, first current collector; 140, second winding core; 142, third electrode layer; 144, fourth electrode layer; 146, second diaphragm; 150, second tab; 200, battery housing; 210, accommodating cavity; 220, receiving body; 230, pressing body; 300, battery cover; 400, sealing ring; 410, groove; 500, first insulating pad; 600, second insulating pad.

The drawings constitute a part of the present disclosure and are used to provide a further understanding of the present disclosure. The exemplary embodiments of the present disclosure and their descriptions are used to explain the present disclosure and do not constitute an improper limitation of the present disclosure.

In order to more clearly explain the embodiments of the present disclosure or the technical solutions in the prior art, the following will briefly introduce the drawings that need to be used in the description of the embodiments or the prior art. it is obvious that the drawings in the following description are only the embodiments of the present disclosure. For those skilled in the art, other drawings can be obtained according to the disclosed drawings without paying creative labor.

DETAILED DESCRIPTION OF THE EMBODIMENTS

The present disclosure will now be described in detail with reference to the accompanying drawings and embodiments in order to make the objects, technical solutions, and advantages of the present disclosure clearer. It should he understood that the specific embodiments described herein are only for explaining the present disclosure, and not intended to limit the present disclosure.

Unless otherwise defined, all technical and scientific terms used herein have the same meaning as commonly understood by one of ordinary skill in the art to which this disclosure belongs. The terms used herein in the description of the present disclosure are for the purpose of describing specific embodiments only, and are not intended to limit the present disclosure. As used herein, the term "and/or" includes any and all combinations of one or more of the associated listed items.

Figure 2:
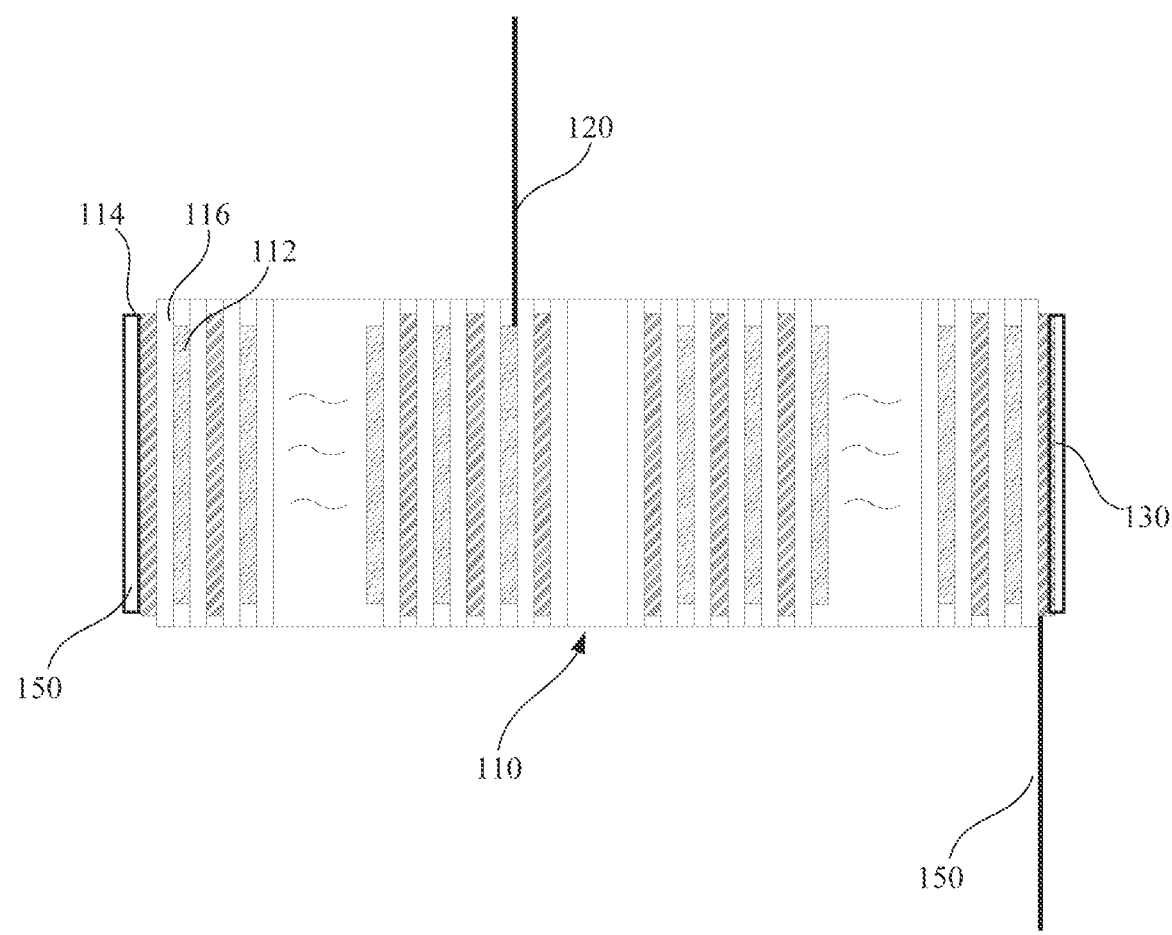
FIG. 2 is a schematic view of a first winding core in FIG. 1.

As shown in FIG. 1 and FIG. 2, in one embodiment, a button battery is provided including an electrode assembly unit 100. The electrode assembly unit 100 includes a first winding core 110, a first tab 120, and a first current collector 130. The first winding core 110 includes a first electrode layer 112, a second electrode layer 114, and a first diaphragm 116 sandwiched between the first electrode layer 112 and second electrode layer 114 that are adjacent to each other. The first electrode layer 112 and the second electrode layer 114 have opposite polarities. The button battery further includes a battery housing 200, a battery cover 300, and an insulating sealing ring 400. The battery housing 200 and battery cover 300 cooperatively forms a sealing cavity through the sealing ring 400. The electrode assembly unit 100 is located in the sealing cavity, and the first electrode layer 112 is electrically connected to the battery cover 300 through the first tab 120, the second electrode layer 114 is electrically connected to the battery housing 200 through the first current collector 130.

The button battery can be flexibly designed according to an internal space requirement of an electronic device. Specifically, the shape of the sealing cavity is designed according to a shape characteristic of the button battery, then the first winding core 110 is used to form a required electrode assembly shape. The first electrode layer 112 is electrically connected to the battery cover 300 through the first tab 120, the second electrode layer 114 is electrically connected to the battery housing 200 through the first current collector 130, then the first tab 120 is used to form an electrode, and the first current collector 130 is used for finishing to form another electrode. which increases the contact area and is beneficial to reduce an internal resistance of a cell. The button battery can increase the contact area, which is beneficial to improve a charging and discharging performance, and improve a stability of the battery during operation.

It should be noted that "the first electrode layer 112 and the second electrode layer 114 have opposite polarities" means that when the first electrode layer 112 is a positive electrode layer, the second electrode layer 114 is a negative electrode layer, alternatively, when the first electrode layer 112 is a negative electrode layer, the second electrode layer 114 is a positive electrode layer.

That is, "the first electrode layer 112 and the third electrode layer 142 have the same polarities" means that they are both positive electrode layers or negative electrode layers.

It should be noted that the first current collector 130 is a metal foil, including but not limited to a copper foil, an aluminum foil, etc.

It should be noted that the electrode assembly unit 100 in the present disclosure is an abbreviation for a combination having an electrode assembly function.

The sealing ring 400 may be a shaped sealing element, or may be formed by coating with a sealant, a specific implementation process will not be repeated here.

Further, a welding manner between the first tab 120 and the battery cover 300, and between the first current collector 130 and the battery housing 200 is resistance welding, ultrasonic welding, and laser welding. Welding shapes formed by the ultrasonic welding include single point, multiple points (more than two points), triangle, rectangle, and circle. Welding spots formed by the laser welding include single point, two points, three points, four points and multiple points, straight lines, cross shapes, etc. Welding shapes formed by the resistance welding include circle, triangle, rectangle, etc.

Currently, an assembly process of a laminated electrode assembly is very complicated, and an expansion of an electrode assembly in a thickness direction will affect the reliability of the sealing, which is easy to cause liquid leakage. While due to internal structural defects of the conventional wound electrode assembly, an improvement of the charge-discharge rate performance will be affected.

Accordingly, in one embodiment, the electrode assembly unit 100 different from the prior art is provided, which has lower internal resistance compared with the conventional wound electrode assembly, and simplifies the assembly process compared with the laminated electrode assembly.

Figure 4:
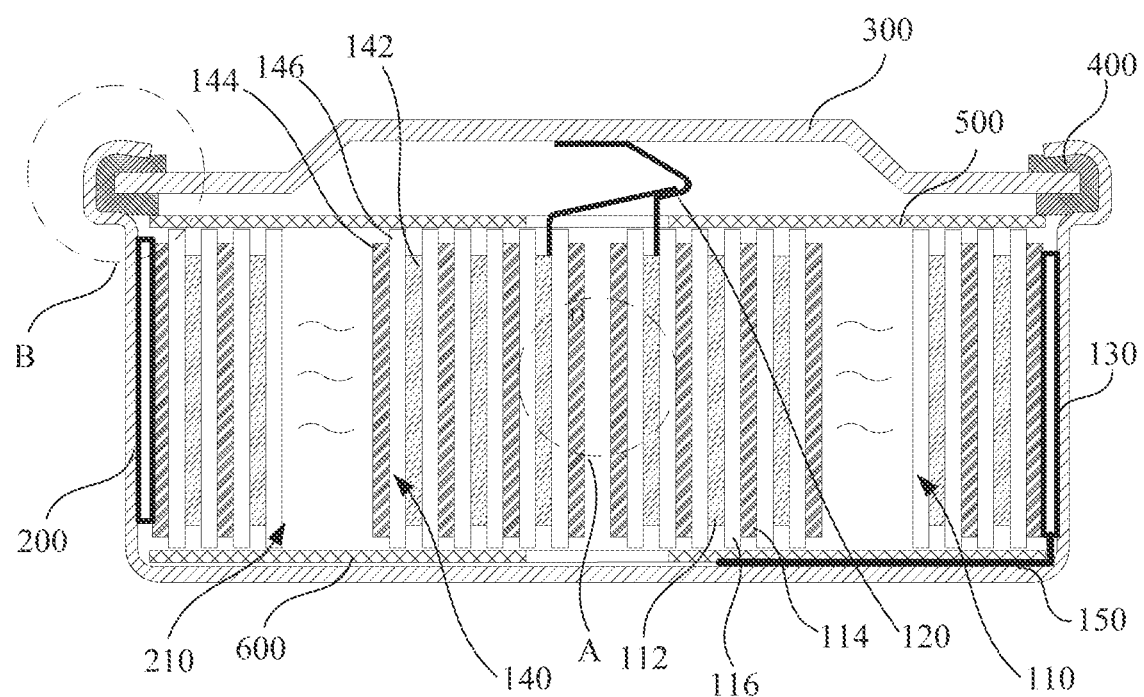
FIG. 4 is a half-sectional view of a button battery according to an embodiment.
Figure 5:
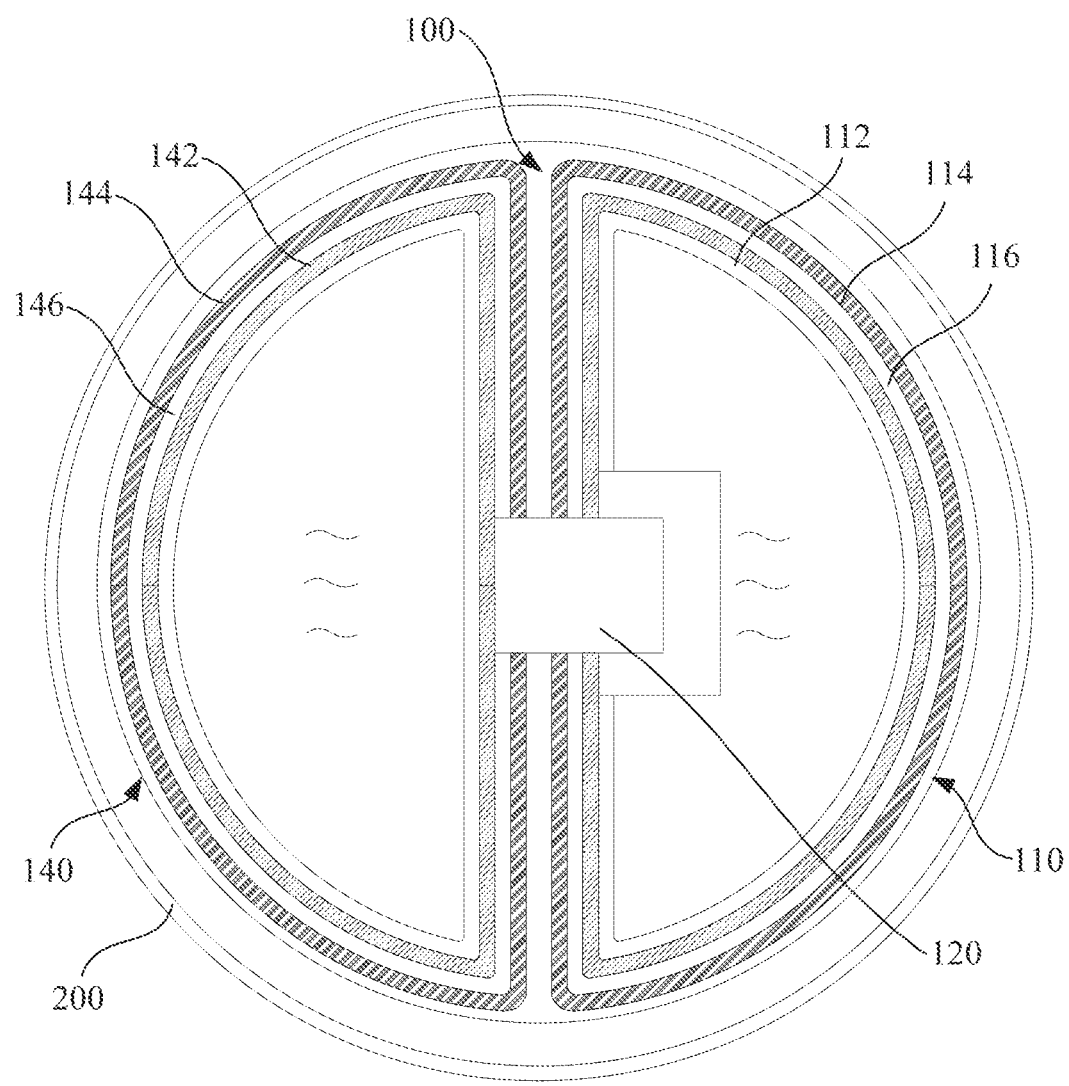
FIG. 5 is a top view of the button battery in FIG. 4.
Figure 6:
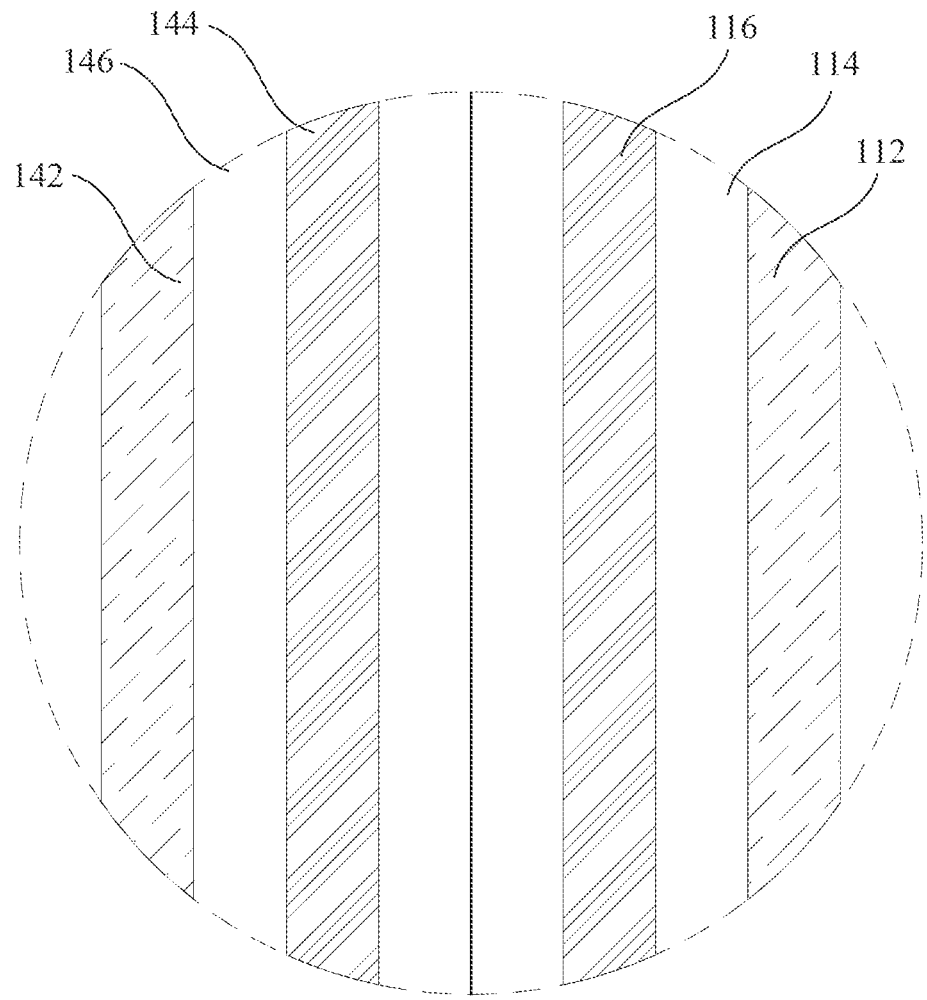
FIG. 6 is a partial enlarged view of A in FIG. 4.

Specifically, as shown in FIG. 4 to FIG. 6, the electrode assembly unit 100 further includes a second winding core 140. The second winding core 140 cooperates with the first winding core 110 to form a preset shape. The second winding core 140 includes a third electrode layer 142 having the same polarity as the first electrode layer 112, a fourth electrode layer 144 having the same polarity as the second electrode layer 114, and a second diaphragm 146 sandwiched between the third electrode layers 142 and the fourth electrode layers 142 that are adjacent to each other. The first electrode layer 112 and the third electrode layer 142 are both electrically connected to the battery cover 300 through the first tab 120, the second electrode layer 114 and the fourth electrode layer 144 are both electrically connected to the battery housing 200 through the first current collector 130. In this way, the first winding core 110 and the second winding core 140 are used to form the preset shape (that is, the required electrode assembly shape can be flexibly configured according to the shape of the button battery). The first electrode layer 112 and the second winding core 140 are electrically connected through the first tab 120, the second electrode layer 114 and the fourth electrode layer 144 are electrically connected though the first current collector 130, so that the first winding core 110 and the second winding core 140 are relatively independent and work in parallel, which can reduce the internal resistance. Compared with the conventional wound electrode assembly, the electrode assembly unit 100 has lower internal resistance, and compared with the laminated electrode assembly, a construction of the electrode assembly can be completed only by combining the first winding core 110 and the second winding core 140, the assembly process is simple.

Meanwhile, the button battery adopting the above-mentioned electrode assembly unit 100 uses the relatively independent winding core to complete the construction of the electrode assembly, the winding core will not expand along its axial direction, thereby avoiding damage to a sealing structure, so that a sealing of the sealing cavity is reliable, and it is not easy to leak liquid. At the same time, using the first winding core 110 and the second winding core 140 to work in parallel is beneficial to improve the charging and discharging rate performance and meet the requirements of electronic products for fast charging.

It should be noted that cross-sections of the first winding core 110 and the second winding core 140 include, but are not limited to, semicircular, polygonal, or a semi-elliptical, etc. Correspondingly, a cross-section of the electrode assembly unit 100 includes, but is not limited to, circular, polygon or ellipse, etc.

In addition, a rolling needle is used in a preparation process of the first rolling core 110 and the second rolling core 140, a cross-section of the rolling needle includes, but is not limited to, semicircular, polygonal, and semi-elliptical.

The above-mentioned polygons include, but are not limited to, a triangle, a quadrilateral, a pentagon, etc.

Further, on a basis of the above embodiments, in one embodiment, the electrode assembly unit 100 further includes a third winding core (not shown). The third winding core cooperates with the first winding core 110 and the second winding core 140 to form the preset shape. The third winding core includes a fifth electrode layer (not shown) having the same polarity as the first electrode layer 112, a sixth electrode layer (not shown) having the same polarity as the second electrode, and a third diaphragm (not shown) sandwiched between the fifth electrode layers and the sixth electrode layers that are adjacent to each other. The first electrode layer 112, the third electrode layer 142 and the fifth electrode layer are all electrically connected to the battery cover 300 though the first tab 120, the second electrode layer 114, the fourth electrode layer 144 and the sixth electrode layer are all electrically connected to the battery housing 200 through the first current collector 130. In this way, by using the third winding core to cooperate with the first winding core 110 and the second winding core 140, more shapes of the electrode assembly unit 100 can be obtained, and the third winding core is connected in parallel, which is beneficial to further reduce the internal resistance of the electrode assembly unit 100.

On the basis of any of the above-mentioned embodiments, in an embodiment, the electrode assembly unit further includes a second current collector (not shown), and the first electrode layer 112 is electrically connected to the first tab 120 through the second current collector. In this way, the first electrode layer 112 can also be finished with the second current collector, then the first tab 120 can be welded to the battery cover 300.

On the basis of any of the above-mentioned embodiments, as shown in FIG. 1 and FIG. 2, in one embodiment, the first tab 120 has elasticity. In this way, using the first tab 120 with elasticity can facilitate elastic contact with the battery cover 300, so that the first tab 120 and the battery cover 300 are in elastic contact, and the first tab 120 and the battery cover 300 are in reliable contact, which is beneficial to increase the contact area during welding.

Figure 3:
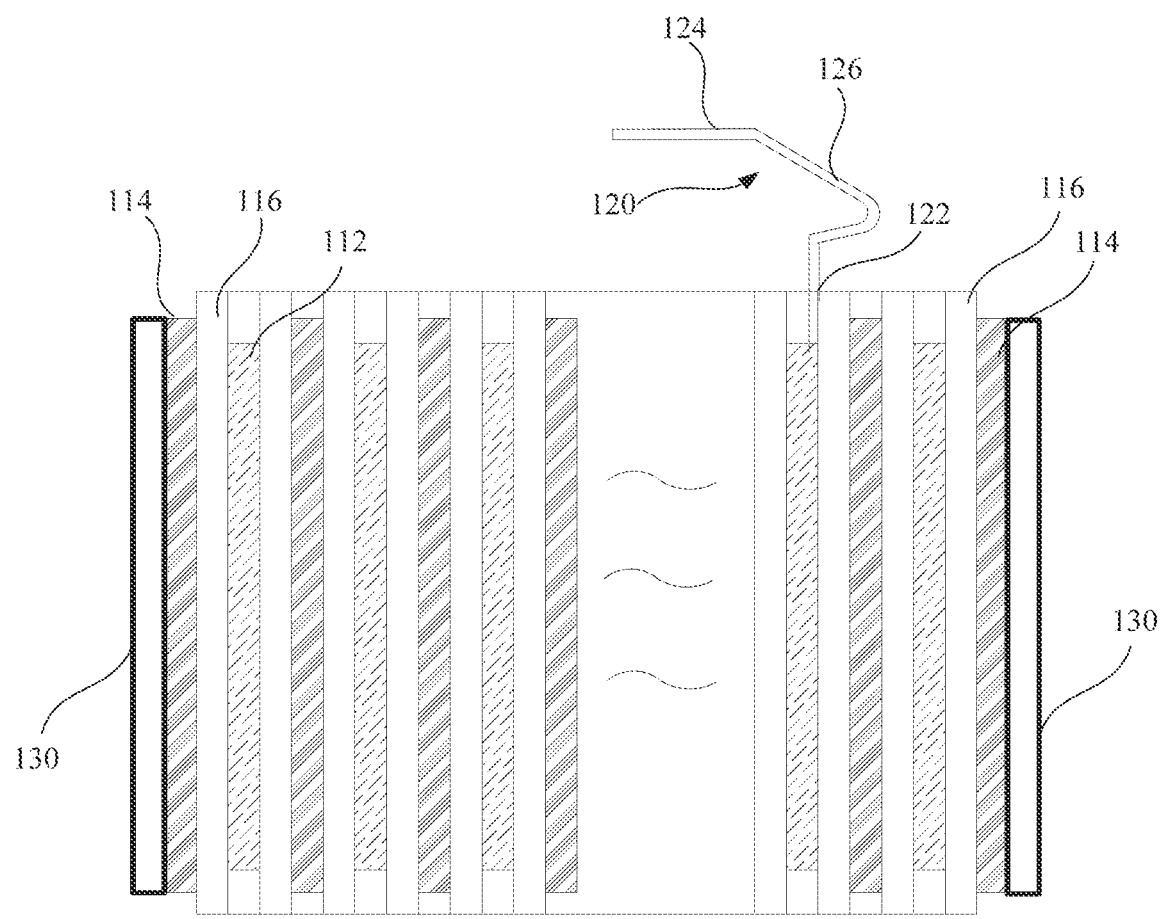
FIG. 3 is a schematic view of an electrode assembly unit according to an embodiment.

Further, as shown in FIG. 3 and FIG. 4, in one embodiment, the first tab 120 includes a connecting body 122, a welding body 124, and an elastic sheet structure 126 located between the connecting body 122 and the welding body 124. The connecting body 122 is electrically connected to the first electrode layer 112, the welding body 124 is welded to the battery cover 300. In this way, the first tab 120 can elastically abut against the battery cover 300 by using the elastic sheet structure 126 formed by bending, so that the first tab 120 and the battery cover 300 are in reliable contact, which is beneficial to increase the contact area during welding.

On the basis of any of the above-mentioned embodiments, as shown in FIG. 1 and FIG. 4, in one embodiment, the button battery further includes a first insulating pad 500 and a second insulating pad 600. The first insulating pad 500 is located between the electrode assembly unit 100 and the battery cover 300, the second insulating pad 600 is located between the electrode assembly unit 100 and a bottom wall of the battery housing 200. In this way, the electrode assembly unit 100 can be reliably located in the sealing cavity to avoid short circuit through the first insulating pad 500 and the second insulating pad 600, and the electrode assembly unit 100 can be elastically pressed and fixed between the battery housing 200 and the battery cover 300 through the first insulating pad 500 and the second insulating pad 600, so that the electrode assembly unit 100 can be fixed more firmly.

Further, as shown in FIG. 1 and FIG. 4, in one embodiment, the electrode assembly unit 100 further includes a second tab 150. The second tab 150 is electrically connected to the first current collector 130, and the second tab 150 is located between the second insulating pad 600 and the battery housing 200, and is welded to the bottom wall of the battery housing 200. In this way, the first current collector 130 can be insulated from an end surface of the electrode assembly unit 100 though the second insulating pad 600, and the second tab 150 can be in close contact with the bottom wall of the battery housing 200 though the pressure generated by the battery cover 300, the electrode assembly unit 100, etc., which is convenient for welding and fixing, and is beneficial to improve a welding quality. At the same time, the first current collector 130 is in close contact with the battery housing 200 to form conduction, and it is beneficial for the second tab 150 to be welded to the battery housing 200 to form a double conduction structure, so that the conduction between the second electrode layer 114 and the battery housing 200 is more reliable.

Figure 7:
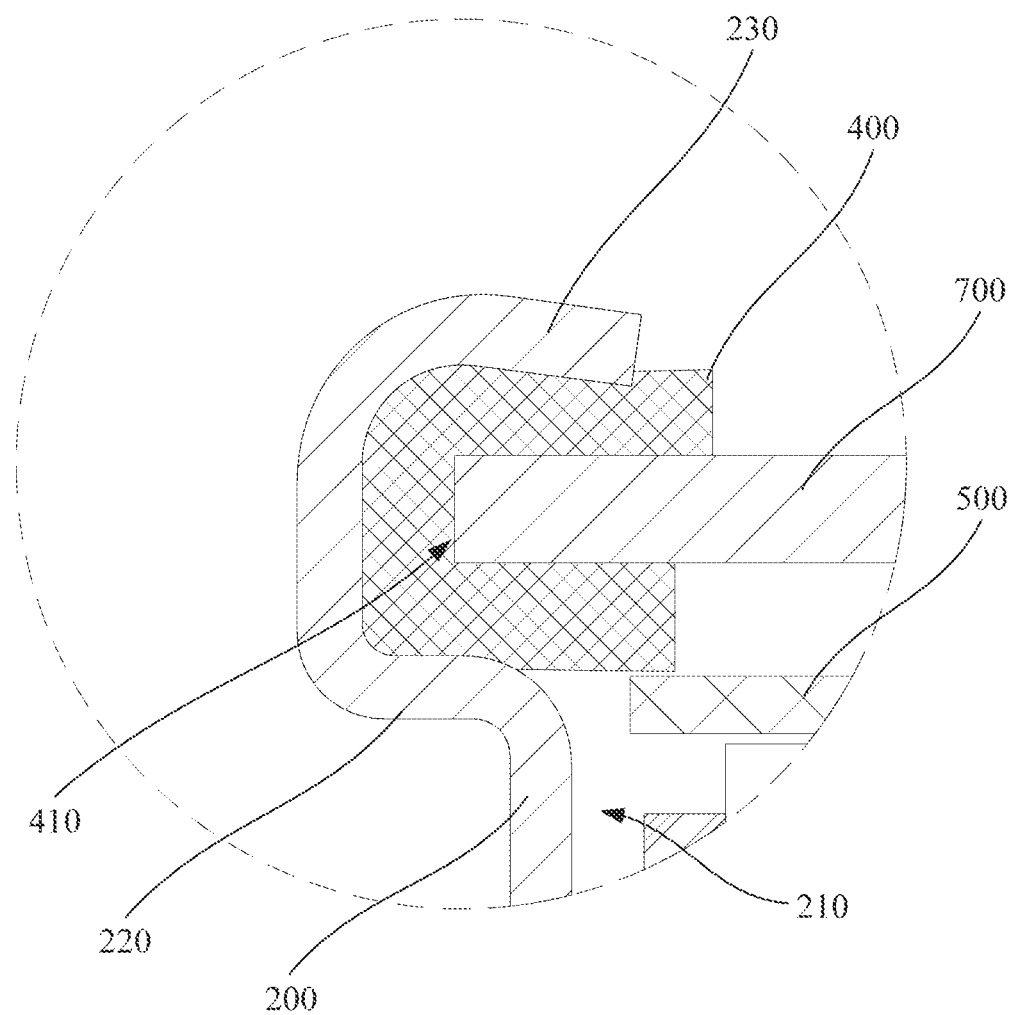
FIG. 7 is a partial enlarged view of B in FIG. 4.

On the basis of any of the above-mentioned embodiments, as shown in FIG. 4 and FIG. 7, in one embodiment, the battery housing 200 is provided with an accommodating cavity 210. The battery housing 200 includes an annular receiving body 220 and a pressing body 230 located on the receiving body 220. The receiving body 220 is sleeved on an outer side of the accommodating cavity 210 and is located at an opening of the accommodating cavity 210. The battery cover 300 is located between the receiving body 220 and the pressing body 230 through the sealing ring 400, the pressing body 230 cooperates with the receiving body 220 to clamp and fix the battery cover 300 and the sealing ring 400.

Furthermore, during the assembling of the button battery, the receiving body 220 and the pressing body 230 formed by bending can be formed at the opening of the housing, then the shaped sealing ring 400 can be placed on the receiving body 220, alternatively, the sealant is coated on the receiving body 220 to form the sealing ring 400, then the battery cover 300 is located on the sealing ring 400. At this time, the battery cover 300 can be pressed and fixed to the receiving body 220 only by forming the pressing body 230 with a bendable portion, and the battery cover 300 seals the accommodating cavity 210 through the sealing ring 400, thereby sealing portions of the button battery in the sealing cavity. It can be understood that the sealing structure of the housing is located at the opening of the sealing cavity, which simplifies the related procedures. Moreover, compared with the prior art, most of the sealing ring 400 does not need to extend into the accommodating cavity 210 and fit with a side wall of the sealing cavity to occupy a space of the sealing cavity, which is conducive to making full use of the sealing cavity to store the electrode assembly unit 100 and the electrolyte, so that under the same conditions, more button battery portions can be sealed, which is beneficial to improve the performance of the button battery.

On the basis of any of the above-mentioned embodiments, as shown in FIG. 7, in one embodiment, the sealing ring 400 is located between the receiving body 220 and the pressing body 230, and forms a groove 410 configured to wrap the battery cover 300. The battery cover 300 is wrapped with the groove 410, a first sealing contact is formed between the receiving body 220 and the battery cover 300, and a second sealing contact is formed between the pressing body 230 and the battery cover 300, so as to further improve the sealing reliability between the battery housing 200 and the battery cover 300. Compared with the prior art, this method can greatly improve the sealing performance of the button battery, so that the reliability of the button battery is higher.

Further, in one embodiment, the battery cover 300 abuts against a bottom wall of the groove 410. In this way, a third sealing contact is formed between a side surface of the battery cover 300 and the bottom wall of the groove 410, which further improves a sealing effect between the battery housing 200 and the battery cover 300, so that the battery cover 300 is wrapped by the sealing ring 400 and is pressed by the receiving body 220 and the battery cover 300, so that a tight sealing structure is formed between the battery housing 200 and the battery cover 300.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which is only for the convenience of describing the present disclosure and simplifying the description, rather than indicating or implying that the device or element must have a specific azimuth, be constructed and operated in a specific azimuth, so it cannot he understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

In the present disclosure, unless otherwise expressly specified and limited, the terms "install", "connect", "contact", "fix" and other terns should be understood in a broad sense, for example, they can be fixed connections, removable connections, or integrated. It can be mechanical connection or electrical connection. It can be directly connected or indirectly connected through an intermediate medium. It can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "disposed on" another element, it can be directly on another element or there can be a centered element. When an element is considered to be "connected" to another element, it can be directly connected to another element or there may be intermediate elements at the same time. Further, when one element is considered to be a "fixed transmission connection" to another element, the two elements can be fixed in a detachable connection, or can be fixed in a non-detachable connection, as long as power transmission can be achieved, such as socket connection, snap connection, integrally formed by molding, welding, etc., in the prior art, and will not be repeated here. When an element and another component are perpendicular or approximately perpendicular to each other, it means that an ideal state of the two elements is vertical, but due to an influence of manufacturing and assembly, there may be a vertical error. The terms "vertical", "horizontal", "left", "right" and similar expressions used herein are for the purpose of illustration only and do not represent the only embodiment.

The foregoing descriptions are merely specific embodiments of e present disclosure, but are not intended to limit the protection scope of the present disclosure. Any variation or replacement readily figured out by a person skilled in the art within the technical scope disclosed in the present disclosure shall all fall within the protection scope of the present disclosure.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A button battery comprising:
an electrode assembly unit comprising a first winding core, a first tab, and a first current collector, wherein the first winding core comprises a first electrode layer, a second electrode layer, and a first diaphragm sandwiched between the first electrode layer and the second electrode layer that are adjacent to each other, the first electrode layer and the second electrode layer have opposite polarities;
wherein the button battery further comprises a battery housing, a battery cover, and an insulating sealing ring, the battery housing and the battery cover cooperatively forms a sealing cavity through the sealing ring, electrolyte is stored in the sealing cavity, the electrode assembly unit is located in the sealing cavity, the first electrode layer is electrically connected to the battery cover through the first tab, and the second electrode layer is electrically connected to the battery housing through the first current collector;
wherein the electrode assembly unit further comprises a second winding core, the second winding core cooperates with the first winding core to form a preset shape, the second winding core comprises a third electrode layer having the same polarity as the first electrode layer, a fourth electrode layer having the same polarity as the second electrode, and a second diaphragm sandwiched between the third electrode layer and the fourth electrode layer that are adjacent to each other, the first electrode layer and the third electrode layer are both electrically connected to the battery cover through the first tab, the second electrode layer and the fourth electrode layer are both electrically connected to the battery housing through the first current collector.

2. The button battery according to claim 1, wherein the electrode assembly unit further comprises a third winding core, the third winding core cooperates with the first winding core and the second winding core to form a preset shape, the third winding core comprises a fifth electrode layer having the same polarity as the first electrode layer, a sixth electrode layer having the same polarity as the second electrode, and a third diaphragm sandwiched between the fifth electrode layer and the sixth electrode layer that are adjacent to each other, the first electrode layer, the third electrode layer and the fifth electrode layer are all electrically connected to the battery cover through the first tab, the second electrode layer, the fourth electrode layer and the sixth electrode layer are all electrically connected to the battery housing through the first current collector.

3. The button battery according to claim 1, wherein the electrode assembly unit further comprises an insulating fixing member, the fixing member is respectively fixed to the first winding core and the second winding core.

4. The button battery according to claim 1, wherein the electrode assembly unit further comprises a second current collector, the first electrode layer is electrically connected to the first tab through the second current collector.

5. The button battery according to claim 1, wherein the first tab comprises a connecting body, a welding body, and an elastic sheet structure located between the connecting body and the welding body, the connecting body is electrically connected to the first electrode layer, the welding body is welded to the battery cover.

6. The button battery according to claim 1, further comprising a first insulating pad and a second insulating pad, wherein the first insulating pad is located between the electrode assembly unit and the battery cover, the second insulating pad is located between the electrode assembly unit and a bottom wall of the battery housing.

7. The button battery according to claim 6, wherein the electrode assembly unit further comprises a second tab electrically connected to the first current collector, the second tab is located between the second insulating pad and the battery housing, and is welded to the bottom wall of the battery housing.

8. The button battery according to claim 1, wherein the battery housing is provided with an accommodating cavity, the battery housing comprises an annular receiving body and a pressing body located on the receiving body, the receiving body is sleeved on an outer side of the accommodating cavity and is located at an opening of the accommodating cavity, the battery cover is located between the receiving body and the pressing body through the sealing ring, the pressing body cooperates with the receiving body to clamp and fix the battery cover and the sealing ring.

9. The button battery according to claim 8, wherein the sealing ring is located between the receiving body and the pressing body, and forms a groove configured to wrap the battery cover.

* * * * *